United States Patent [19]
Grote et al.

[11] 3,760,715
[45] Sept. 25, 1973

[54] MACHINE FOR SLICING SAUSAGE AND APPLYING THE SLICES TO PIZZA IN A PREDETERMINED PATTERN

[76] Inventors: James E. Grote, 998 Thurman Ave.; Delbert J. Fisher, 3121 Wessex Ct., both of Columbus, Ohio 43206

[22] Filed: Dec. 20, 1971

[21] Appl. No.: 209,552

[52] U.S. Cl.......... 99/450.1, 83/409, 83/437, 83/467, 83/477, 83/477.2, 83/715, 99/494
[51] Int. Cl....... B26d 7/06, A47j 37/00, A21c 9/04
[58] Field of Search........................ 99/450.1, 537; 83/409, 417, 437, 707, 715, 467, 477, 477.2; 220/21; 221/93, 94; 108/148

[56] References Cited
UNITED STATES PATENTS

| | | | |
|---|---|---|---|
| 3,633,450 | 1/1972 | Grote | 83/201 |
| 1,791,417 | 2/1931 | Lilienfield | 220/21 X |
| 1,817,805 | 8/1931 | Davenport | 220/21 |
| 1,094,710 | 4/1914 | Flohr | 83/477.2 |
| 1,387,869 | 8/1921 | Royle | 83/477 X |
| 2,605,799 | 8/1952 | Ratti | 83/201.14 |

*Primary Examiner*—Wayne A. Morse, Jr.
*Assistant Examiner*—Alan I. Cantor
*Attorney*—William V. Miller et al.

[57] ABSTRACT

A machine which receives and holds a group of sausage sticks over a pizza with their axes vertical and substantially perpendicular to the pizza and with their lower ends spaced above the pizza. The group of sausage sticks is moved laterally relative to a band-type cutting blade and the pizza is simultaneously moved therewith so that as the sausage slices are severed from the lower ends of the sticks, they drop in a predetermined pattern on the pizza. The machine includes improved sausage holding means, improved adjustments for varying the thickness of the sausage slices severed, improved adjustments for producing different diameter pizzas, and removability of certain parts to permit refrigeration.

13 Claims, 8 Drawing Figures

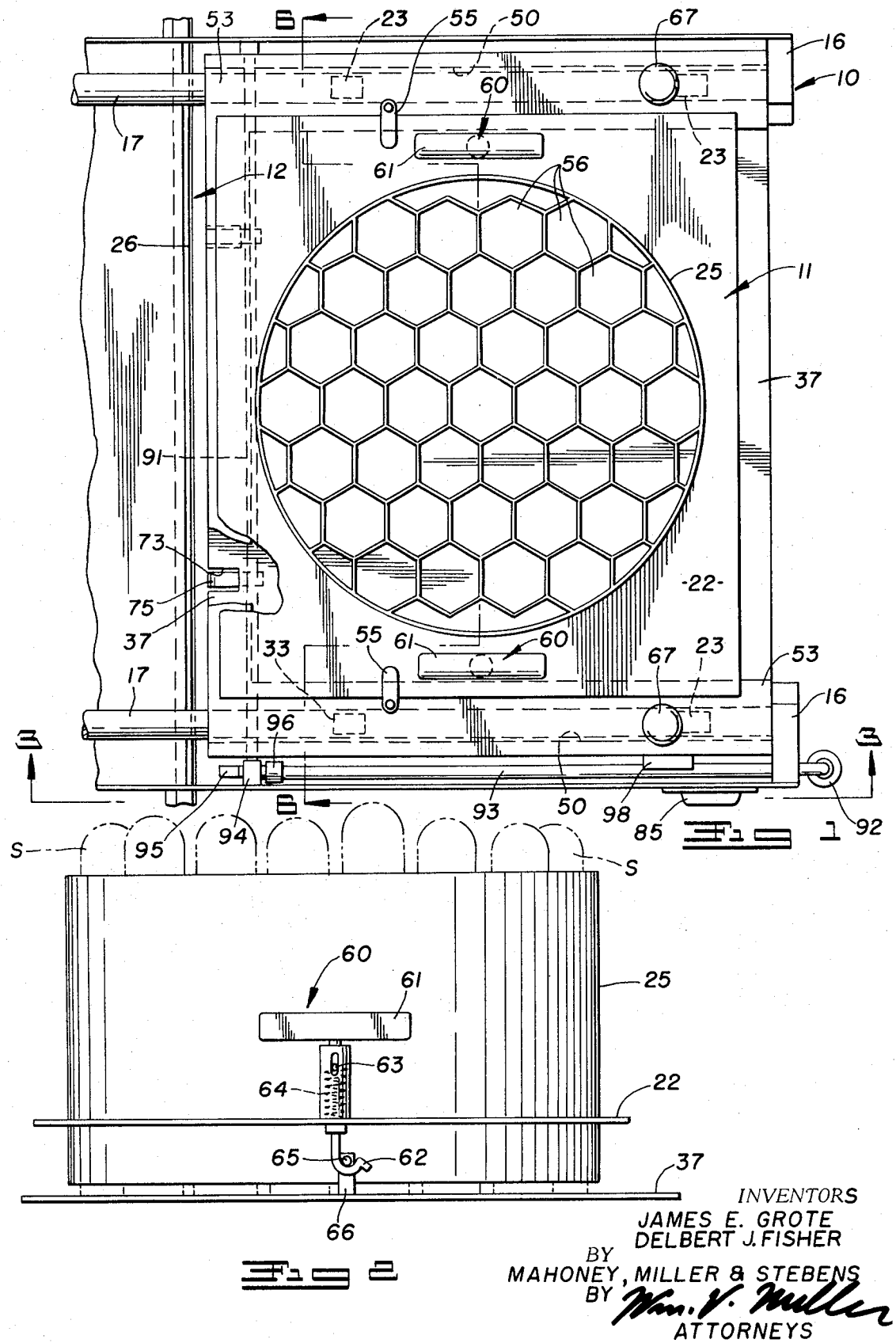

INVENTORS
JAMES E. GROTE
DELBERT J. FISHER
BY MAHONEY, MILLER & STEBENS
BY [signature]
ATTORNEYS

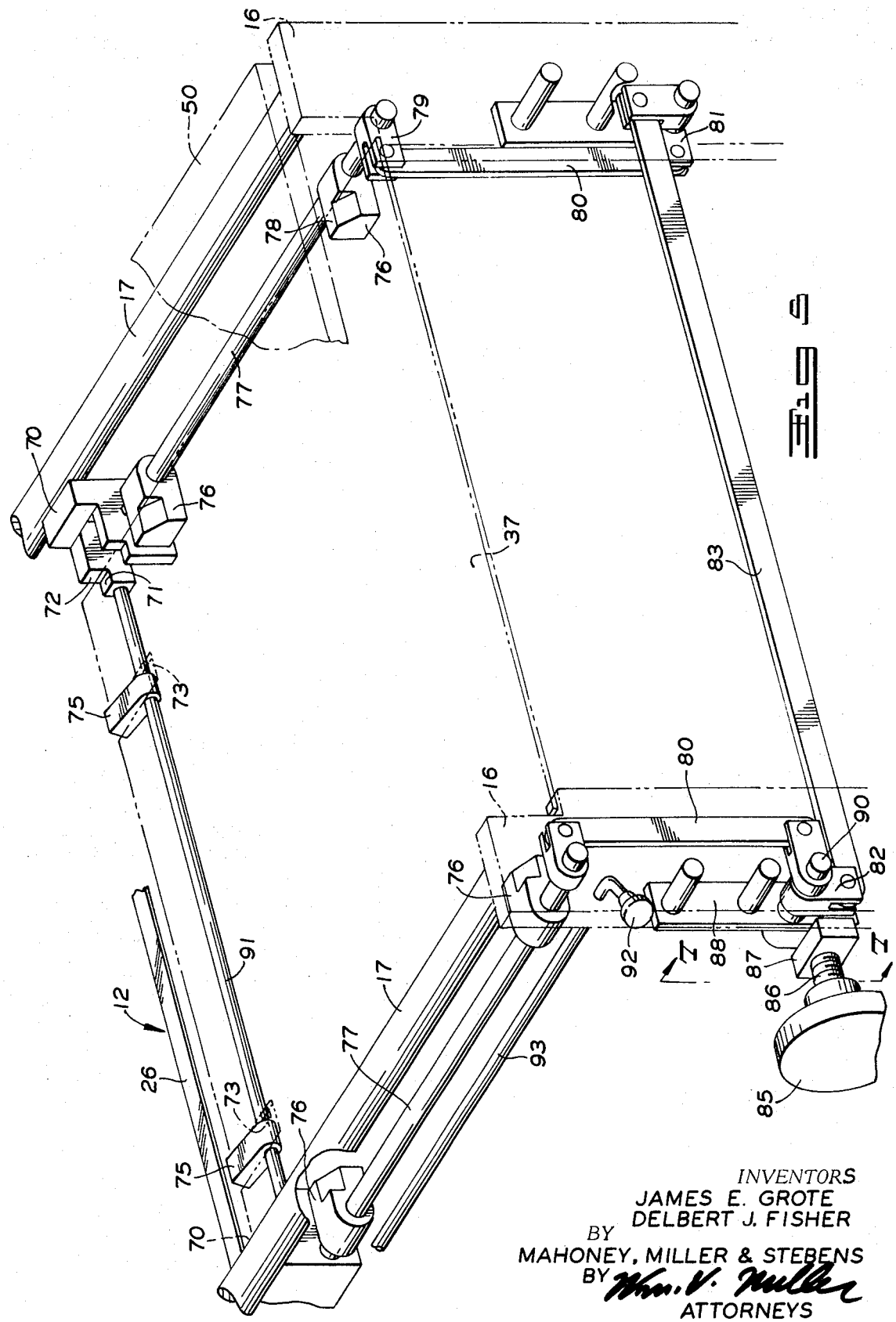

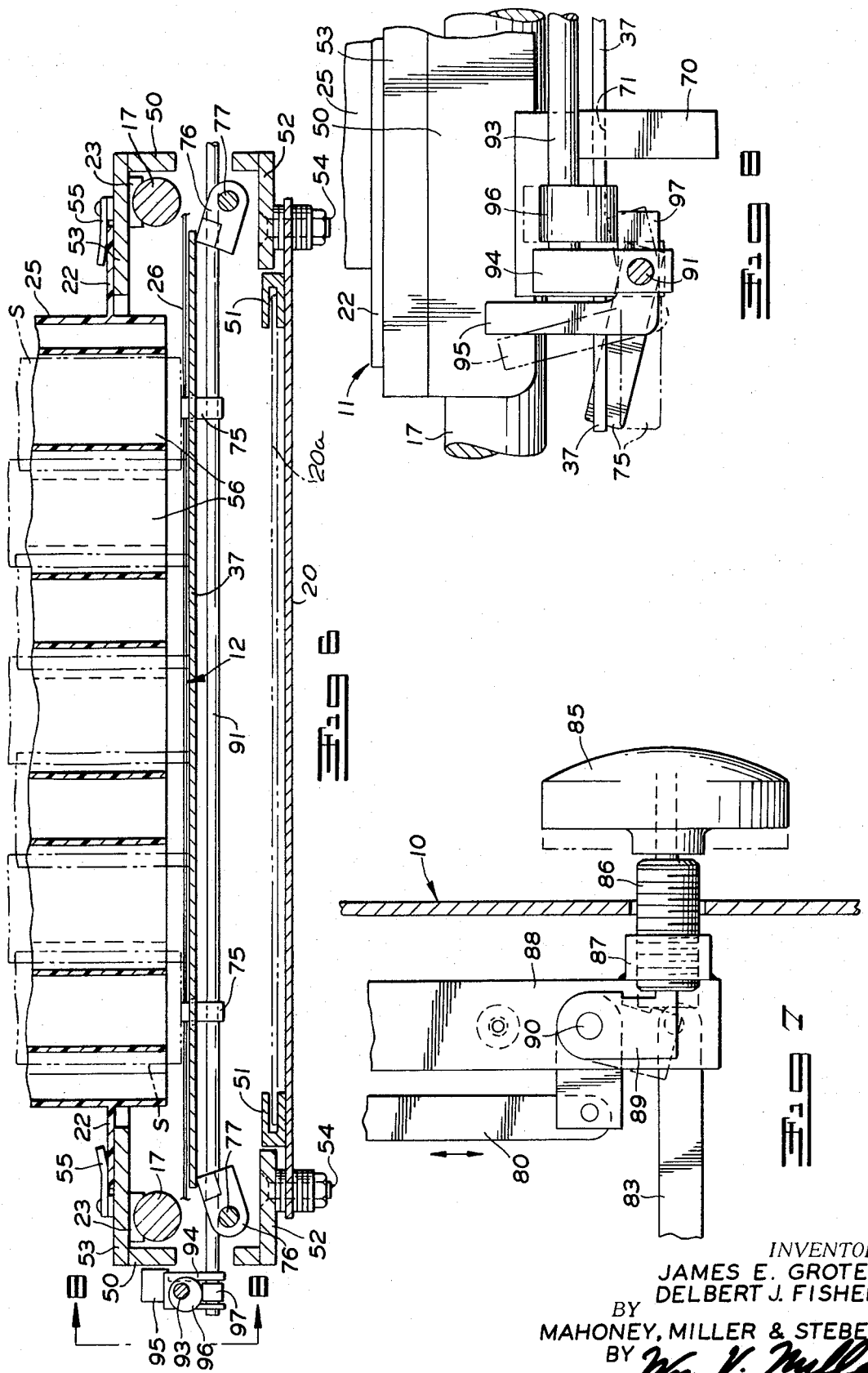

MACHINE FOR SLICING SAUSAGE AND APPLYING THE SLICES TO PIZZA IN A PREDETERMINED PATTERN

This invention deals with improvements on the machine disclosed in the copending application of James E. Grote, Ser. No. 35,726, filed July 27, 1971, U.S. Pat. No. 3,633,450 of Jan. 11, 1972.

There have been many types of sausage slicing machines used in the past in connection with the application of sausage slices, such as pepperoni slices, to the pizza before baking, and some of these machines have been very effective in producing the slices. However, it has then been necessary to handle the slices individually and apply them in a proper pattern on the pizza. This is not only time-consuming, but often results in a non-uniform application of the slices to the pizza. Furthermore, considerable wastage results from dropping slices during handling and from applying the slices to the pizza in multiple layers.

In said copending application there is disclosed a machine which has a sausage carrier that will receive a group of the sausage sticks in a pattern corresponding to that to be produced on the pizza, will hold them with their axes substantially vertical and with their lower ends exposed for cutting and arranged above the pizza, which is received and supported by a tray on the machine, and will move the exposed ends into association with a band-type cutting blade and simultaneously move the pizza, while maintaining its original relationship to the sticks, so that the severed slices will drop in the predetermined pattern onto the pizza. The machine can receive sausage sticks of any diameter and length and will automatically feed them into cutting position and automatically drop the slices in proper positions on the pizza without wastage.

The present invention is an improvement over that machine in that it provides an improved carrier for holding the sausage sticks vertically and perpendicular to a sausage stick support plate at the cutting plane; improved adjustable means for varying the relative vertical position of the sausage sticks and cutting blade to vary the thickness of slices provided; improved adjustments for producing different diameter pizzas by varying the area covered by the severed sausage slices; and removability of the sausage stick carrier and the sausage support plate as a unit to permit refrigeration and thereby avoid loading and unloading as well as cleaning each time the machine is used.

The best mode contemplated for carrying out this invention is illustrated in the accompanying drawings in which:

FIG. 1 is a top plan view of a portion of the machine showing the improved sausage carrier and cooperating parts.

FIG. 2 is a side elevational view showing the sausage carrier and sausage stick support plate hooked together and removed from the machine.

FIG. 5 is a perspective view showing the means for raising and lowering the sausage stick support plate to vary the thickness of the sausage slices produced and selective means for lifting side rows of the sausage sticks over the knife blade.

FIG. 6 is a vertical sectional view taken along line 6—6 of FIG. 1.

FIG. 7 is an enlarged vertical sectional view taken along line 7—7 of FIG. 5.

FIG. 8 is an enlarged elevational view taken from the position indicated at line 8—8 of FIG. 6.

Figure 3:
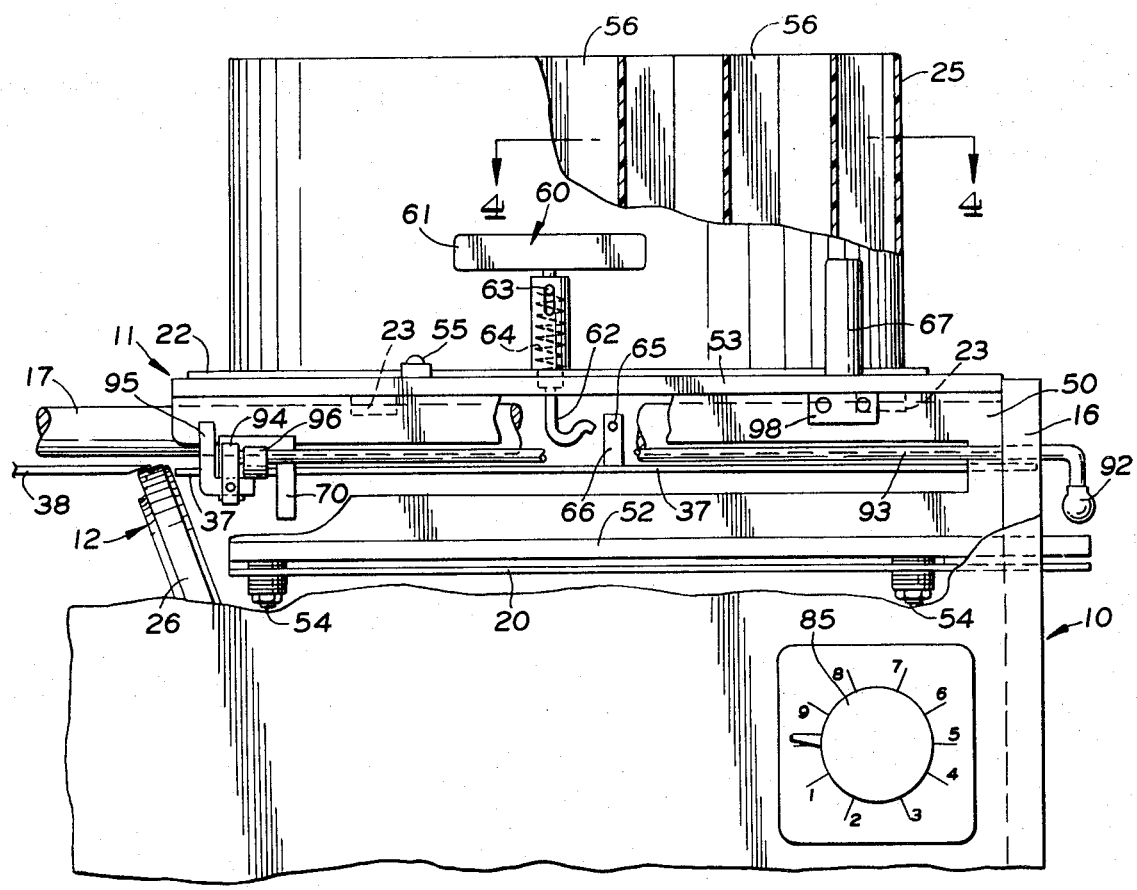
FIG. 3 is a side elevational view, partly cut away, taken from the position indicated at line 3—3 of FIG. 1.

The present machine in its general structure is similar to the one disclosed in said prior copending application. In the following description, the improved structures will be described as applied to that machine and reference to that machine will be made only insofar as necessary to provide a clear understanding of the improvements.

That machine includes generally a carriage guide and support unit 10, a carriage 11 reciprocably mounted on the unit 10, and a band-type power-driven knife unit 12, as disclosed in said application. The unit 10 includes the vertical posts 16, and the horizontally extending guide rails 17 supported thereby. The carriage 11 is mounted on the rails 17 for manual reciprocation longitudinally thereof. In this instance, upper rails 17 only are used for the mounting of the carriage. The carriage is mounted on the rails 17 for reciprocation by means of the yokes 23 fixed to the carriage and resting on the rails.

In this form of the invention, the carriage 11 includes a pair of support brackets 50 each of which is of U-form in vertical cross-section opening toward the knife unit 12, (FIG. 3). These brackets are disposed in laterally spaced parallel relationship and are fixed in such relationship by means of a lower support plate 20. This support plate 20 is adapted to carry at its upper side, a pizza tray 20a. This tray is slidably received within inwardly opening guide channels 51 which are fixed to the upper side of plate 20 in parallel relationship. Each bracket 50 carries the inwardly extending horizontal lower flange 52, to which the plate 20 is fastened by means of clamping bolts 54. Each bracket 50 also carries a similar upper flange 53 which supports the plate 22 that carries the sausage hopper 25. The plate 22 rests on the flanges 53 and is removably secured thereto by the pivoted spring clips 55. The flanges 53 carry in their lower surfaces, the yokes 23 which slidably support the entire carriage 11 on the guide rods 17. It will be noted that the carriage includes means for supporting the sausage hopper 25 and means at a lower level for supporting the pizza tray 20a.

As before, the hopper 25 supports the sausage sticks S, such as pepperoni, vertically for downward feeding movement by gravity. Also, the lower ends of the sticks, in the initial position of the carriage, engage and rest on the horizontal plate 37, and in an advanced position on fixed plate 38 as before. In this instance, the plate 37 is supported differently so that it will be vertically adjustable but will not move horizontally. Also, the plate 37, though normally immovable horizontally, so that the hopper 25 can move with the carriage horizontally relative thereto, can be adjusted vertically to vary the thickness of the sausage slices and can be selectively connected to the hopper support plate 22 for removal with the hopper 25 for refrigeration. It will be noted that plate 37 (FIG. 6) is directly below rails 17 and that U-shaped brackets 50 are laterally outwardly thereof.

Figure 4:
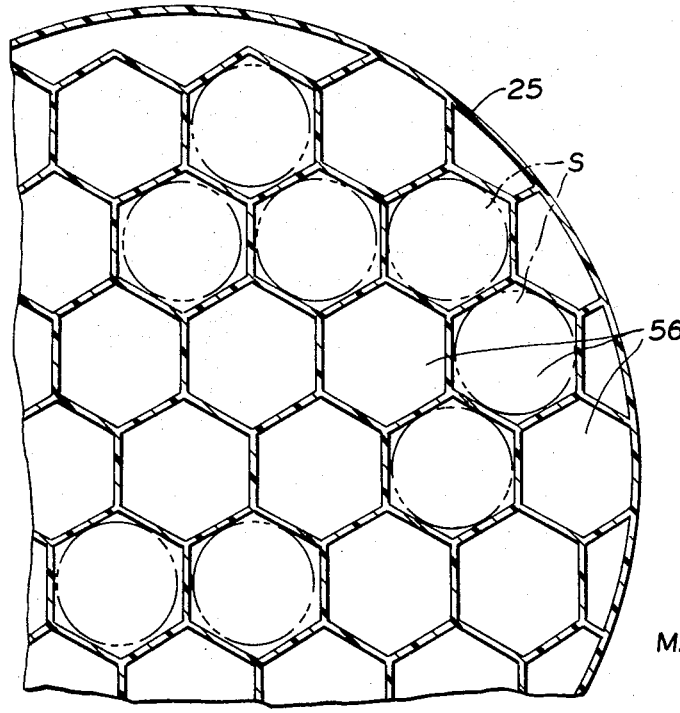
FIG. 4 is an enlarged partial horizontal sectional view taken along line 4—4 of FIG. 3.

In this case, the hopper 25 is provided with vertical partitions (FIGS. 1 and 4) of such formation as to divide it into separate sausage receiving sockets 56 which are open at both their upper and lower ends. These sockets are of hexagon horizontal cross-section and slightly larger in cross-section than the sausage sticks. By making them of this form, the sticks are kept separate, substantially perpendicular to the plate 37 and free to feed downwardly into contact therewith, as the slices are severed from the lower exposed ends of the sticks.

To connect the plate 37 to the hopper 25 for removal as a unit when desired, the hopper support plate 22 carries at diametrically opposed points, relative to the hopper, the hook units 60. Each hook unit includes a plunger (FIG. 2) which has a handle 61 at its upper end and a hook 62 at its lower end. A pin and slot arrangement 63 prevents rotation of the plunger and a tension spring 64 normally pulls the plunger upwardly to raise the hook 62 above the level of a transverse pin 65 which is supported on the plate 37 and above its plane by means of lugs 66 upstanding therefrom. Ordinarily, the hooks 62 will be above the pins 65 and will not hook thereon during movement of the plate 22 and hopper 25 with the carriage 11. However, when desired, the plunger of each unit can be pushed downwardly to engage the hooks with the pins by slight horizontal movement and then the hopper 25 can be lifted, after release of clips 35, by the handles 61 and the plate 37 will be lifted simultaneously by shifting to the right and moving upwardly, these members being hooked together as a single unit. Upstanding handles 67 are provided on the U-shaped brackets 50 for reciprocating the carriage 11.

Means, according to the present invention, for locating the plate 37 in its normal position laterally and longitudinally on the machine and for vertically adjusting it is illustrated in the drawings and particularly in FIG. 5. This means includes a pair of supports 70 carried by the support unit 10 in fixed positions at opposite sides of the machine and just ahead of the knife unit 12. Each of these supports has a shelf surface 71 at its inner side upon which the plate 37 rests in its lowermost position and an upstanding guide surface 72 at the outer extent thereof for locating the plate 37 laterally. Longitudinal positioning of the plate 37 is permitted by means of a pair of laterally spaced forwardly opening notches 73 which cooperate with a pair of cam fingers 75 will be referred to later. For raising and lowering the plate 37 relative to the support shelves 71, four levers 76 are located to engage the lower surface of the plate 37 at its respective corners. A pair of those levers is provided at each side, the levers having their outer ends keyed on a longitudinal shaft 77 and extending inwardly therefrom, these shafts being rotatably mounted in the corresponding supports 70 carried by the unit 10, and the forward legs 16 of that unit. Means is provided for turning the two shafts simultaneously so as to lift or lower all four corners of the plate 37 uniformly. When horizontal, as in FIG. 5, the flat sides 78 of the levers are flush with the shelves 71 and have the plate 37 resting thereon.

The two shafts 77 are rotated by means of rocker arms 79 keyed to their forward ends and pivotally mounted to the upper ends of the links 80. One link is moved vertically by a bellcrank lever 81 and the other by a bellcrank lever 82, those two levers being connected together for simultaneous swinging movement by a connecting bar 83 which extends across the machine. The bellcrank lever 82 is rotated by means of a knob 85 (FIG. 7) at one side of the machine which is keyed to a screw 86 that is threaded into a socket 87 (FIG. 7) carried by a fixed support 88, the inner end of the screw engaging a depending arm 89 keyed to the same pivot shaft 90 to which the bellcrank lever 82 is keyed. Thus, rotation of the knob 85 swings the four levers 76 and adjusts the vertical position of the plate 37 relative to the blade 26 thereby changing the thickness of the sausage slices produced.

Sometimes it is desirable to produce pizzas of less diameter than the hopper 25. Therefore, means is provided, according to this invention, to reduce the diameter of the area supplied with the slices of sausage. This means includes the pair of cam fingers 75 (FIG. 5) previously mentioned. These cams are in the form of levers keyed to a transverse shaft 91 which is carried by the opposed supports 70. Rotation of the shaft will position these levers below or above the upper surface of the plate 37. They are so located laterally that when above the plate 37 they will engage the two innermost rows of sausage sticks positioned in the hopper 25 toward the sides of the machine. They will be inclined upwardly so that as the carriage 11 advances over the blade 26, the lower ends of such sticks will be engaged by the inclined cam fingers 75 so as to lift such sticks over the knife 26 to prevent those particular sticks from being sliced. Thus, the transverse diameter of the area covered by the sausage is reduced by the lifting cam fingers 75.

The shaft 91 may be rotated by means of a handle 92 (FIGS. 1 and 3) at the forward side of the machine, which is carried on the forward end of the longitudinal shaft 93. This shaft is mounted for rocking movement at that side of the machine, its rear end being mounted in the adjacent leg 11 and its forward end being mounted in a yoke bearing member 94 (FIG. 8) secured to the adjacent member 70. The yoke bearing member 94 has the shaft 91 extending transversely through its depending arms and between these arms is mounted a stop member 95 which is L-shaped and is keyed on the shaft 91. An eccentric arm 96 is keyed on the shaft 93 adjacent the member 94 and engages with the lower arm 97 which is an extension of the stop 95. Thus, rotation of the shaft 93, rotates the arm 97 to swing the stop 95 upwardly to an operative position and at the same time lifts the cam fingers 75. The upstanding stop 95 will engage with a stop block 98 secured to the side of the adjacent U-shaped bracket 50 (FIG. 1), this block being located adjacent the rear end of the carriage w 11. Thus, the extent of forward movement of the carriage will be limited to prevent slicing of the one or more rows of sausage sticks at the rear side of the hopper. At the same time, rows of the sticks of sausage S at opposite sides of the hopper 25 will be lifted over the blade 26 in the advancing movement of the carriage 11. Thus, the area on the pizza covered by the sliced sausage will be reduced in both lateral and longitudinal directions.

It will be apparent from the above that normally the hopper 25 will be mounted on the carriage with the clips 55 in retaining position and the hooks 62 will be released so the hopper will reciprocate with the carriage 11 over the sausage supporting plate 37. However, when desired, the hooks may be engaged, the clips 55 released, and the hopper shifted to the right and lifted from the carriage and lifting with it the hook-suspended plate 37. Thickness of the slices of sausage produced is adjusted merely by turning the knob 85. Assuming the cam fingers 75 and the stop 95 are not in operative positions, they may be adjusted to such positions merely by turning the handle 92 to reduce the area covered by the slices of sausage produced during advancing of the carriage 11.

Thus, it will be apparent from the above that this invention provides a substantially improved machine over that disclosed in said copending application.

Having thus described this invention, what is claimed is:

1. A machine for slicing and applying sausage or the like to pizza or the like comprising:
supply means for receiving the sausage in the form of sticks and supporting them with their ends exposed;
a support on which the pizza is supported in a plane spaced from the supply means and from the lower ends of the sticks therein;
a cutting means located adjacent one side of the supply means at a selected level; and
means for moving the sausage sticks supply means and the support simultaneously so as to move the exposed ends of the sticks into cooperation with the cutting means which cuts slices therefrom and applies them to the pizza on said support including;
a carriage reciprocably mounted on a base;
said carriage being provided with the supply means in the form of an upright hopper for receiving the sticks with their axes substantially vertical and projecting from the lower end of the hopper;
said carriage also being provided with the pizza support means in the form of a substantially horizontal plate spaced below the hopper;
a sausage sticks support plate carried on said support and guide unit and disposed in a substantially horizontal plane beneath said hopper and above said pizza support plate for engaging the lower ends of the sausage sticks when the carriage is in its initial position so as to support the sticks;
said pizza support plate supporting the pizza at a level which is below the level of said sausage support plate; and
means for supporting said sausage plate for vertical movement relative to said cutting means to vary the thickness of sausage slices produced and applied to said pizza;
said last-named means comprising vertically movable supports at spaced positions beneath the sausage plate; and
control means for adjusting all of said supports simultaneously and uniformly;
said control means including levers pivoted for vertical swinging movement on which said sausage plate rests; and
means for swinging all of said levers simultaneously.

2. A machine according to claim 1 in which:
said sausage support plate has its leading edge, relative to the direction of advance of the carriage, located adjacent said cutting means, and
means is provided for cooperating with said plate at said edge for engaging the lower ends of certain sausage sticks on said hopper to lift them over said cutting means during the advance of said carriage.

3. A machine according to claim 2 including:
stop means for limiting the advancing movement of said carriage.

4. A machine according to claim 3 in which:
said stick-engaging means comprises cam-fingers located in slots at the leading edge of said sausage plate and normally in inoperative positions;
said stop means includes a movable stop normally inoperative to interfere with movement of the carriage; and
means is provided for moving such stop to an operative position and cam-fingers to operative stick-engaging positions.

5. A machine according to claim 4 in which:
said moving means comprises single actuating means connected to said movable stop and said cam-fingers.

6. A machine according to claim 1 in which:
said hopper rests on the carriage but is removable;
said sausage plate normally rests on the support and guide unit but is removable; and
selective means is provided for suspending the sausage plate from the hopper to permit removal as a unit.

7. A machine according to claim 6 in which:
said hopper is provided with vertical sockets open at their upper and lower ends and being of hexagonal horizontal cross-section.

8. A machine according to claim 1 including:
stop means for limiting the advancing movement of said carriage.

9. A machine for slicing and applying sausage or the like to pizza or the like comprising:
supply means for receiving the sausage in the form of sticks and supporting them with their ends exposed;
a support on which the pizza is supported in a plane spaced from the supply means and from the lower ends of the sticks therein;
a cutting means located adjacent one side of the supply means at a selected level; and
means for moving the sausage sticks supply means and the support simultaneously so as to move the exposed ends of the sticks into cooperation with the cutting means which cuts slices therefrom and applies them to the pizza on said support including;
a carriage reciprocably mounted on a base;
said carriage being provided with the supply means in the form of an upright hopper for receiving the sticks with their axes substantially vertical and projecting from the lower end of the hopper;
said carriage also being provided with the pizza support means in the form of a substantially horizontal plate spaced below the hopper;
a sausage sticks support plate carried on said support and guide unit and disposed in a substantially horizontal plane beneath said hopper and above said pizza support plate for engaging the lower ends of the sausage sticks when the carriage is in its initial position so as to support the sticks;
said pizza support plate supporting the pizza at a level which is below the level of said sausage support plate; and
said sausage support plate has its leading edge, relative to the direction of advance of the carriage, located adjacent said cutting means; and means cooperating with said plate at said edge for engaging the lower ends of certain sausage sticks on said hopper to lift them over said cutting means during the advance of said carriage.

10. A machine according to claim 9 including:
stop means for limiting the advancing movement of said carriage.

11. A machine according to claim 10 in which:
said moving means comprises a single actuating means connected to said movable stop and said cam-fingers.

12. A machine for slicing and applying sausage or the like to pizza or the like comprising:
supply means for receiving the sausage in the form of sticks and supporting them with their ends exposed;
a support on which the pizza is supported in a plane spaced from the supply means and from the lower ends of the sticks therein;
a cutting means located adjacent one side of the supply means at a selected level; and
means for moving the sausage sticks supply means and the support simultaneously so as to move the exposed ends of the sticks into cooperation with the cutting means which cuts slices therefrom and applies them to the pizza on said support including;
a carriage reciprocably mounted on a base;
said carriage being provided with the supply means in the form of an upright hopper for receiving the sticks with their axes substantially vertical and projecting from the lower end of the hopper;
said carriage also being provided with the pizza support means in the form of a substantially horizontal plate spaced below the hopper;
a sauage sticks support plate carried on said support and guide unit and disposed in a substantially horizontal plane beneath said hopper and above said pizza support plate for engaging the lower ends of the sausage sticks when the carriage is in its initial position so as to support the sticks;
said pizza support plate supporting the pizza at a level which is below the level of said sausage support plate; and
said hopper resting on the carriage but being removable;
said sausage plate normally resting on the support and guide unit but being removable; and
selective means for suspending the sausage plate from the hopper to permit removal as a unit.

13. A machine according to claim 12 in which:
said selective means comprises hooks carried by the hopper for selective engagement with retainers in the sausage plate.

* * * * *